(12) United States Patent
Atwood et al.

(10) Patent No.: US 7,347,191 B2
(45) Date of Patent: Mar. 25, 2008

(54) VEHICLE FUEL SYSTEM

(75) Inventors: Jeffrey M. Atwood, Orange, CT (US);
David A. Brady, Worchester, MA (US);
John R. Forgue, Cheshire, CT (US);
Matthias Henschel, Rheinmuenster (DE); Mark R. Johansen, Wallingford, CT (US); Michael Kloess, Karlsruhe (DE); Peter P. Kuperus, Cass City, MI (US); Martin Stickel, Muggensturm (DE)

(73) Assignee: TI Group Automotive Systems, L.L.C., Warren, MI (US)

( * ) Notice: Subject to any disclaimer, the term of this patent is extended or adjusted under 35 U.S.C. 154(b) by 273 days.

(21) Appl. No.: 11/155,787

(22) Filed: Jun. 17, 2005

(65) Prior Publication Data
US 2005/0279406 A1    Dec. 22, 2005

Related U.S. Application Data

(60) Provisional application No. 60/582,009, filed on Jun. 22, 2004.

(51) Int. Cl.
*F02M 37/20* (2006.01)
(52) U.S. Cl. .................. 123/516; 123/625
(58) Field of Classification Search ............ 123/516, 123/518, 519, 520; 137/574, 576, 565
See application file for complete search history.

(56) References Cited

U.S. PATENT DOCUMENTS

| | | | |
|---|---|---|---|
| 4,819,607 A * | 4/1989 | Aubel ..................... 123/519 |
| 4,872,439 A * | 10/1989 | Sonoda et al. ............ 123/519 |
| 4,887,578 A * | 12/1989 | Woodcock et al. ......... 123/519 |
| 4,928,657 A | 5/1990 | Asselin |
| 5,044,397 A * | 9/1991 | Szlaga et al. ............. 137/587 |
| 5,080,421 A * | 1/1992 | Otowa et al. ............ 296/97.22 |
| 5,131,439 A | 7/1992 | Bucci |
| 5,193,511 A * | 3/1993 | Fujino ..................... 123/520 |
| 5,211,151 A * | 5/1993 | Nakajima et al. ........... 123/520 |
| 5,275,145 A | 1/1994 | Tuckey |
| 5,408,977 A | 4/1995 | Cotton |
| 5,579,802 A | 12/1996 | Tuckey |
| 5,590,697 A * | 1/1997 | Benjey et al. .............. 141/59 |
| 5,647,334 A * | 7/1997 | Miller ..................... 123/520 |
| 5,660,206 A | 8/1997 | Neal et al. |
| 5,669,361 A * | 9/1997 | Weissinger et al. ......... 123/520 |
| 5,870,997 A * | 2/1999 | Mukai ..................... 123/520 |

(Continued)

*Primary Examiner*—Thomas Moulis
(74) *Attorney, Agent, or Firm*—Reising, Ethington, Barnes, Kisselle, P.C.

(57) ABSTRACT

A fuel system with a fuel tank having at least one opening into an interior of the fuel tank, and an electrically operated vent valve having an inlet communicated with the interior of the fuel tank and an outlet for venting fuel vapor from the fuel tank. The vent valve is movable in response to an electric signal between an open position allowing fuel vapor through the outlet and a closed position to restrict fluid flow through the outlet. A controller is operably communicated with the vent valve to control application of an electric signal to the vent valve and thereby control at least in part the movement of the vent valve between its open and closed positions. In one embodiment the controller is responsive to a fill level in the fuel tank to control the position of the vent valve and thereby the fill level attained within the fuel tank.

35 Claims, 5 Drawing Sheets

U.S. PATENT DOCUMENTS

| | | |
|---|---|---|
| 5,960,817 A | 10/1999 | Johansen et al. |
| 6,000,426 A | 12/1999 | Tuckey et al. |
| 6,145,532 A | 11/2000 | Tuckey et al. |
| 6,199,574 B1 * | 3/2001 | Harris ..................... 137/199 |
| 6,327,898 B1 * | 12/2001 | Harris ..................... 73/49.2 |
| 6,367,458 B1 * | 4/2002 | Furusho et al. ............ 123/519 |
| 6,386,222 B1 * | 5/2002 | Harris ..................... 137/199 |
| 6,488,015 B2 | 12/2002 | Isobe |
| 6,533,002 B1 * | 3/2003 | Kobayashi et al. ......... 141/302 |
| 6,594,562 B2 * | 7/2003 | Kaiser et al. ................ 701/29 |
| 6,634,341 B2 | 10/2003 | Crary et al. |

* cited by examiner

VEHICLE FUEL SYSTEM

REFERENCE TO RELATED APPLICATION

Applicant claims priority of U.S. provisional patent application Ser. No. 60/582,009, Filed Jun. 22, 2004.

FIELD OF THE INVENTION

This invention relates generally to vehicle fuel systems, and more particularly to devices controlling fuel flow in and vapor venting from a fuel tank.

BACKGROUND OF THE INVENTION

Fuel tanks within a fuel system of a vehicle have a generally fixed volume in which to maintain fuel. Generally, the maximum fill level for liquid fuel within the fuel tank is controlled by a mechanical shut-off valve that vents the fuel tank. Frequently, this valve is referred to as a fill limit valve. The fill limit valve typically has a float to open and close an orifice in the valve in response to the level of liquid fuel in the tank. When the float reaches a predetermined level indicating the desired maximum fuel level in the fuel tank, the fill limit valve is closed. With the fill limit valve closed it is no longer possible to vent the fuel tank and the pressure inside the tank increases, thereby causing liquid fuel to back-up in a fill tube which actuates an automatic shut-off of a vehicle refueling pump nozzle and terminates the flow of fuel into the tank. The maximum desired fuel level within a vehicle fuel tank is usually less than the total volume of the fuel tank to provide a vapor dome or head space in the tank. The fill limit valve is frequently mounted in that head space in the tank.

Mechanical float valves are typically sized to accommodate the shape and size of the fuel tank in which they are housed. As a result, a mechanical float valve suitable for one fuel tank may not be suitable for another. In addition, generally, mechanical float valves do not provide a repeatable fill level of fuel within the tank from one fill sequence to another. It is not uncommon for a variance of up to one-half gallon or more between the fill sequences.

In addition, fuel tanks typically have additional valves separate from the fill limit valve to provide other venting functions, for example and without limitation, a rollover valve that acts as a vent while open, and automatically closes should the vehicle become inverted to protect against fuel from leaking out of the fuel tank. Having separate valves performing individual functions adds to the complexity and cost of the vehicle fuel system.

SUMMARY OF THE INVENTION

A fuel system that includes a fuel tank having at least one opening into an interior of the fuel tank, an electrically operated vent valve having an inlet in communication with the interior of the fuel tank and an outlet through which fuel vapor is vented from the fuel tank, the vent valve being movable at least in part in response to an electric signal between an open position to allow fuel vapor to flow from the interior of the fuel tank through the outlet and a closed position to restrict fuel vapor flow through the outlet, and a controller operably communicated with the vent valve to control application of an electric signal to the vent valve and thereby control at least in part the movement of the vent valve between its open and closed positions. In one presently preferred implementation the controller is programmable to selectively open the vent valve under predetermined conditions. In another implementation the controller is responsive to a fill level in the fuel tank during a refueling event to control the opening and closing of the vent valve and thereby control the fill level attained within the fuel tank.

An aspect of one presently preferred embodiment of the invention provides a vent valve for controlling the fuel level and venting of a fuel tank that includes a housing having an outlet operably communicated with fluid within a fuel tank, an electrically operated valve carried by the housing, and movable in response to application of an electric signal to the valve for movement between a first position and a second position and a float received in the housing for movement relative to the outlet in response to movement of the valve. The float is movable between an open position permitting fluid flow through the outlet and a closed position at least substantially restricting fluid flow through the outlet. In one presently preferred embodiment, the float is responsive to the presence of liquid fuel acting on the float to close the outlet independently of the electrically operated valve. And according to another presently preferred aspect, the float may close the outlet if the vehicle overturns or is inclined beyond a threshold.

Some potential objects, features and advantages that may be achieved by at least some of the presently preferred embodiments of this invention include providing a fuel system with an electrically operated vent valve for controlled venting of the fuel tank, controlled filling of the fuel tank, repeatable and accurate maximum fill level control, is programmable to meet individual vehicle platform specifications, enables an increased usable volume for fuel in the fuel tank, can make real time adjustments in response to environmental factors such as pressure, temperature, engine duty cycle, vehicle accelerations, vehicle inclination and fuel level, prevents liquid fuel flow to a fuel vapor canister, prevents fuel from exiting the fuel tank during a vehicle rollover, is of relatively simple design, economical in manufacture and assembly, and in service has a long useful life.

BRIEF DESCRIPTION OF THE DRAWINGS

These and other objects, features and advantages of this invention will be apparent from the following detailed description of the preferred embodiments and best mode, appended claims and accompanying drawing in which:

DETAILED DESCRIPTION OF THE PREFERRED EMBODIMENTS

Figure 1:
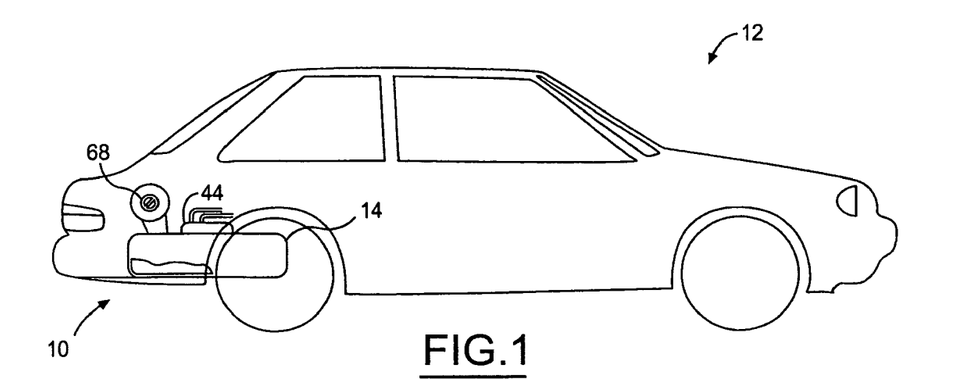
FIG. 1 is a partially broken away side view of a vehicle having a vehicle fuel system according to one presently preferred embodiment of the invention.
Figure 2:
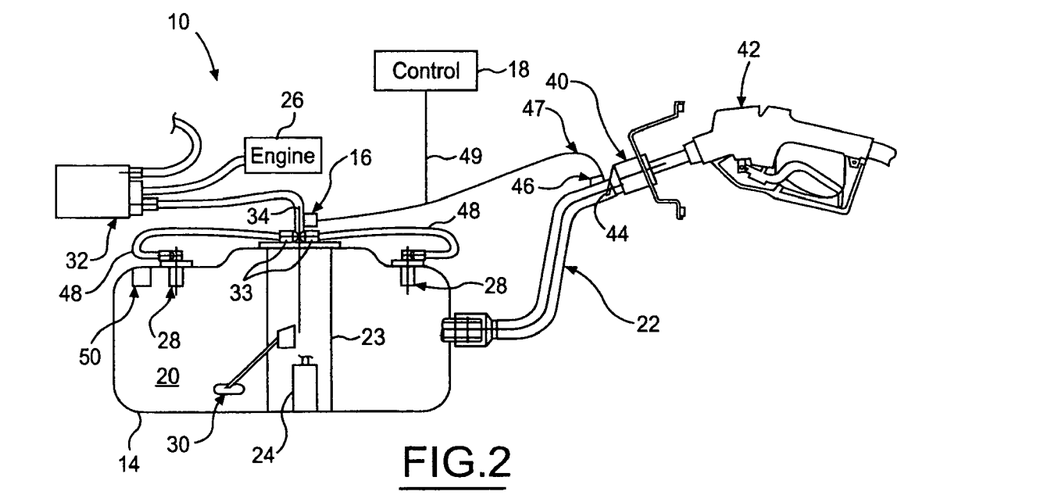
FIG. 2 is a schematic side view of one presently preferred embodiment of the vehicle fuel system of FIG. 1.

Referring in more detail to the drawings, FIGS. 1 and 2 illustrate a fuel system 10 constructed according to one presently preferred embodiment of this invention for a vehicle 12 having a fuel tank 14 and at least one electrically operated vent valve 16 (EOVV 16) to control the release of fuel vapor from the fuel tank 14. The EOVV 16 can be actuated by a controller 18 that monitors and/or is responsive to a plurality of conditions within and outside of the fuel tank 14. For example, the controller 18 may be responsive to a refueling event wherein fuel is added to the fuel tank 14 to open the EOVV 16 and allow fuel vapor to be displaced from the fuel tank. The controller 18 may also be responsive to internal fuel tank pressure to open when a threshold pressure is reached within the tank 14 to limit the maximum tank pressure. The controller 18 can also be responsive to various vehicle operational conditions such as vehicle acceleration (speeding up or hard braking, for example) and other conditions that may cause fuel in the fuel tank 14 to slosh around, and can close the EOVV 16 to prevent liquid fuel from escaping through the EOVV 16. Hence, the controller 18 can be a stand alone unit, or can be part of or in communication with one or more vehicle control units, such as a vehicle electronic control unit (ECU).

As best shown in FIG. 2, according to one presently preferred embodiment, the fuel system 10 includes the fuel tank 14 that has an interior volume 20 in which liquid fuel is held, a fill tube 22 through which fuel is added to the fuel tank 14, a fuel pump module 23 within the fuel tank 14 and including a fuel pump 24 from which pressurized fuel is discharged for delivery to an engine 26, one or more rollover vent valves 28 each preferably communicated with the EOVV 16, a fuel level sensor 30, a fuel vapor canister 32 and the controller 18 that is preferably operably communicated with the EOVV 16 and the fuel level sensor 30. In this embodiment, all fuel vapor released from the fuel tank 14 preferably flows through a single opening, which is an outlet 34 of the EOVV 16 and fluid flow through that opening is controlled by the electrically operated vent valve, such as a solenoid valve. Further, all of the vented fuel vapor preferably flows to the fuel vapor canister 32 which can be of conventional construction, and may vent "cleaned" vapor/air to the atmosphere and preferably has a purge cycle wherein fuel vapor is delivered to an intake manifold of a vehicle engine.

The EOVV 16 preferably has at least one inlet 33 through which fuel vapor and air from the fuel tank 14 enter the EOVV 16, and an outlet 34 preferably communicated with the fuel vapor canister 32. The inlets 33 may communicated with the rollover valves 28 and/or one or more inlets 33 may communicate directly with the fuel tank interior 20. The EOVV 16 preferably has a valve element that is driven by application of an electrical signal between an open position permitting fluid flow through its outlet 34 and to the vapor canister 32 and a closed position at least substantially preventing fluid flow through its outlet. The EOVV 16 may be a solenoid valve driven between its open and closed positions by the controller 18 in response to preprogrammed instructions or various signals or conditions monitored by or communicated to the controller 18.

Figure 4:
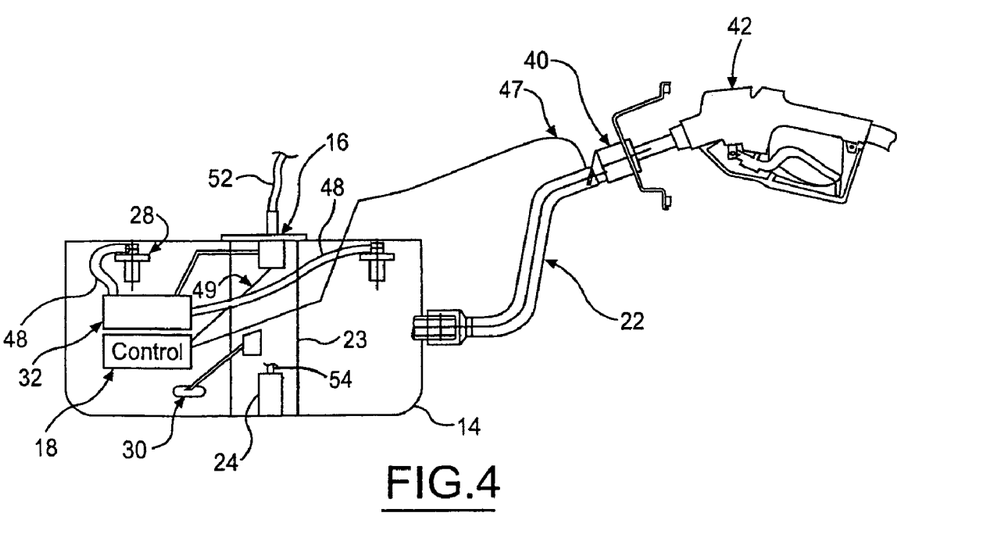
FIG. 4 is a partial schematic side view of another embodiment of the vehicle fuel system.

For example, the fill tube 22 is open at one end to the fuel tank 14 and is adapted at its other end 40 to receive a refueling nozzle 42 of a gas station refueling pump. The fill tube 22 may include a fill door 44 that is opened when a refueling nozzle 42 from a refueling pump is inserted into the end 40 of the fill tube 22 to add fuel to the fuel tank 14. A refueling sensor 46 may be provided in or adjacent to the fill tube 22 to determine when the fill door 44 is open, and thereby, when a refueling event is beginning or occurring. By way of example, the refueling sensor 46 may include a variety of switches, such as a reed switch (in one implementation a magnet is carried by the fill door and a reed switch is carried by the fill tube), hall-effect sensor, and the like. The refueling sensor 46 is communicated with the controller 18, such as by a wire 47 extending between them, to provide a signal to the controller 18 when the fill door 44 is open. The controller 18, in turn, sends a signal such as by a wire 49 to the EOVV 16 to drive it to its open position (or, if it is already open, to ensure that it is and remains open) to permit a relatively free flow of fuel vapor out of the fuel tank 14 during the refueling event. In the embodiment shown, during refueling, fuel vapor may flow out of the fuel tank 14 through the rollover vent valves 28, through vapor lines 48 connected to the EOVV 16, and thereafter through the EOVV outlet 34 to the fuel vapor canister 32. As shown in FIG. 4, the rollover vent valves 28 could also be located entirely within the fuel tank 14, with the vapor lines 48 entirely or at least partially within the fuel tank 14, if desired.

The level of fuel within the fuel tank 14 is determined, at least in part, by the fuel level sensor 30 in the fuel tank 14. The fuel level sensor 30 can be of any suitable type including conventional float arm and resistor sensors, piezo devices, thermistor devices, and the like. Preferably, a signal indicative of the fuel level within the fuel tank 14 is communicated to the controller 18 by the fuel level sensor 30. The controller 18, in turn, provides a signal to close the EOVV 16 when the fuel tank 14 is full, or nearly so, and thereby terminates vapor venting from the fuel tank 14. Since fuel vapor cannot be displaced from the fuel tank 14 with the EOVV 16 closed, the pressure within the fuel tank 14 rises as additional fuel is added, and this will cause fuel to back-up within the fill pipe 22 and trigger an automatic shut-off of the refueling pump by way of a sensor within the refueling nozzle 42, and this may be done in conventional manner.

To permit additional fuel to be added to the fuel tank 14, sometimes called "rounding-up" or "trickle fill," the controller 18 may open the EOVV 16 after a certain interval of time. The duration that the EOVV 16 is closed may be dependent on many factors including tank shape, fill pipe orientation, refueling rate, and the like, and should be long enough to ensure that the refueling shut-off event has occurred. Subsequent refueling shut-off events can be controlled at preprogrammed intervals, limited to a predetermined or otherwise determined number of attempts, or as desired, to permit a maximum desired fill level to be obtained in the fuel tank 14. Once the maximum fill level is obtained, the EOVV 16 is preferably maintained in its closed position to prevent additional fuel from being added to the tank 14.

Figure 14:
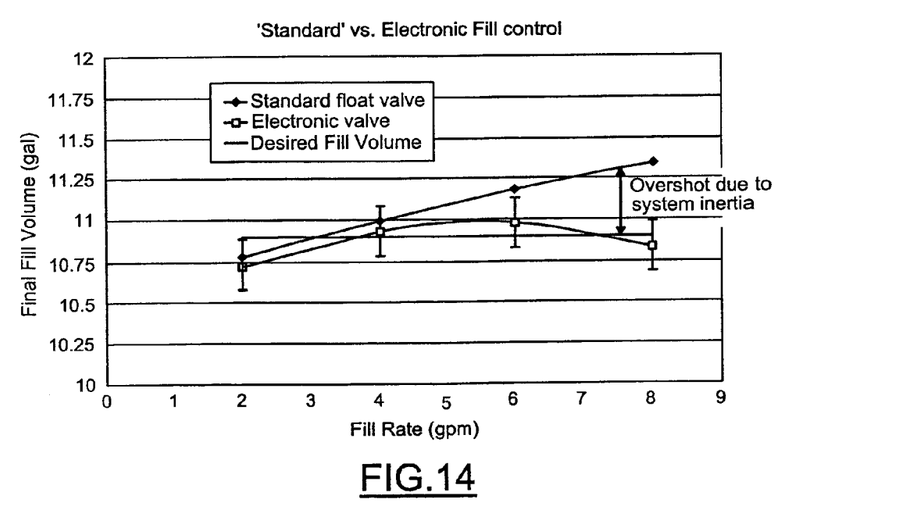
FIG. 14 is a graph illustrating overfill levels in a fuel tank by comparison between mechanical fill limit valves and one embodiment of the present invention with an electrically operated fill limit valve.

In one embodiment, the controller 18 samples the fill level signal from the fuel level sensor at certain intervals, and compares the fill levels as a function of the elapsed time between sampled signals. From this information, the controller 18 can determine the rate at which fuel is being added to the fuel tank 14. The rate at which fuel is added to the fuel tank 14 can be used to, at least in part, determine when the EOVV 16 should be closed to achieve a desired fill level in the fuel tank 14. This determination can be made based at least in part on three variables: current fuel level or volume of fuel in the fuel tank 14; desired maximum fuel level or volume of fuel in the fuel tank 14; and the rate at which fuel is being added to the fuel tank 14. Preferably, this provides a consistent fill level in the fuel tank 14 at refueling shut-off, and prevents or reduces so-called "over-shoot" which is a condition when the desired maximum fill level in the fuel tank 14 is exceeded. The fill rate information can also be used to more accurately control trickle filling and the maximum or final fuel level in the fuel tank 14 after the refueling event. With greater control over the final fill level a greater total volume of the fuel tank 14 can be usable without overfilling the fuel tank 14. FIG. 14 is a graph of final fuel volume (in gallons) as a function of fill rate (in gallons per minute), and generally shows the improved control over the final fuel volume in the fuel tank that was demonstrated by testing a fuel system 10 according to the present invention as compared to a conventional fuel system with a mechanical fill limit valve.

After a refueling event, the controller 18 may close the EOVV 16 after, for example, some programmed interval, a determined interval, or after a signal is sent that the fill door 44 has closed indicating that the refueling pump nozzle 42 has been removed from the fill pipe 22. While the preceding discussion has set forth a sensor 46 associated with the fill door 44 in the fill tube 22, other indicators of a refueling event can be used. Representative examples include a sensor on a cap that closes the fill tube 22 and indicates when the cap has been removed from the fill tube 22, a sensor responsive to fluid flow in the fill tube 22, a sensor providing an indication of increasing fuel level within the fuel tank 14, etc.

In addition to refueling the tank 14, the fuel system 10 can be responsive to other vehicle conditions and provide for other conditions, like diurnal venting, fuel tank pressure control, and fuel tank 14 leak checks. In the latter, some vehicles are currently required to have on-board diagnostic sensors (such as so-called OBDII sensors) and or testing to insure the integrity of the fuel tank 14. One way of doing this is by applying a vacuum to the fuel tank 14, closing the tank, and monitoring the pressure within the closed fuel tank 14. An increase in the fuel tank pressure (loss of vacuum) is indicative of a leak in the fuel tank 14. Diurnal venting may be achieved based on many factors, such as temperature, pressure, time vehicle engine has been off, and the like. To permit such venting, the EOVV 16 can be moved or maintained in its open position. A pressure sensor 50 responsive to at least a threshold pressure within the vehicle fuel tank 14, preferably is also communicated with the controller 18 to provide an indication when a maximum desired pressure exists in the fuel tank 14. In that condition, the controller 18 can open the EOVV 16 to relieve the internal tank pressure and prevent damage to the fuel tank 14, its components, and/or a seal such as between a component and the fuel tank 14. In this manner, the maximum pressure within the fuel tank 14 can be controlled.

The electrically operated vent valve 16 preferably can also be driven to one or more intermediate positions between its open and closed positions to provide a variable size and variable flow rate venting orifice. Further, the EOVV 16 can be positioned upstream of the fuel vapor canister 32, as shown in FIG. 2, or can be positioned downstream of the fuel vapor canister 32 as generally shown in FIG. 4. Particularly when downstream of the fuel vapor canister 32, the EOVV 16 can also be used as a purge valve to control the purge cycle of the canister 32. The effective flow area of the outlet 34 can be made large for relatively free vapor flow therethrough such as during refueling event, and can be made smaller such as during a purge event of the fuel vapor canister 32. Also, by closing the EOVV 16 except when fuel vapor needs to be vented from the fuel tank 14, the load on the vapor canister 32 is less and a smaller vapor canister can potentially be used. Also, the closed EOVV 16 prevents liquid fuel from flowing into the fuel vapor canister 32, and this also permits use of a smaller vapor canister.

More than one EOVV can be used, and each EOVV 16 can be located inside or outside of the fuel tank 14, or can be mounted on the fuel tank 14 and extending through the fuel tank wall to communicate directly with the interior 20 of the fuel tank 14. This increases the flexibility of the fuel system 10 and can further limit or prevent liquid fuel flow to the vapor canister 32 such as by, for example, mounting the EOVV 16 outside the fuel tank 14 with an increased flow path for liquid fuel to reach the EOVV 16. If desired, the controller 18 and/or the fuel vapor canister 32 can also be mounted inside the fuel tank 14 as shown in FIG. 4. Locating such components inside the fuel tank 14 can minimize the openings through the fuel tank 14 and the connections of components outside of the fuel tank 14 to reduce fuel vapor emission from the fuel tank 14. For example, the rollover valves 28 and vent valve(s) 16 can all communicate with the vapor canister 32 inside the fuel tank with fewer openings in the fuel tank required for vapor lines and wires. In the example shown, only wires leading to the controller 18, a vapor line 52 from the EOVV 16, a fuel line 54 from the fuel pump 24 and the fill tube 22 pass through the fuel tank 14. All of these components could be routed through one opening, if desired. One example of a fuel system with a fuel vapor canister and control module, that may function in the manner of the controller 18 previously discussed, is set forth in U.S. Pat. No. 6,302,144 the disclosure of which is incorporated herein by reference in its entirety.

Figure 3:
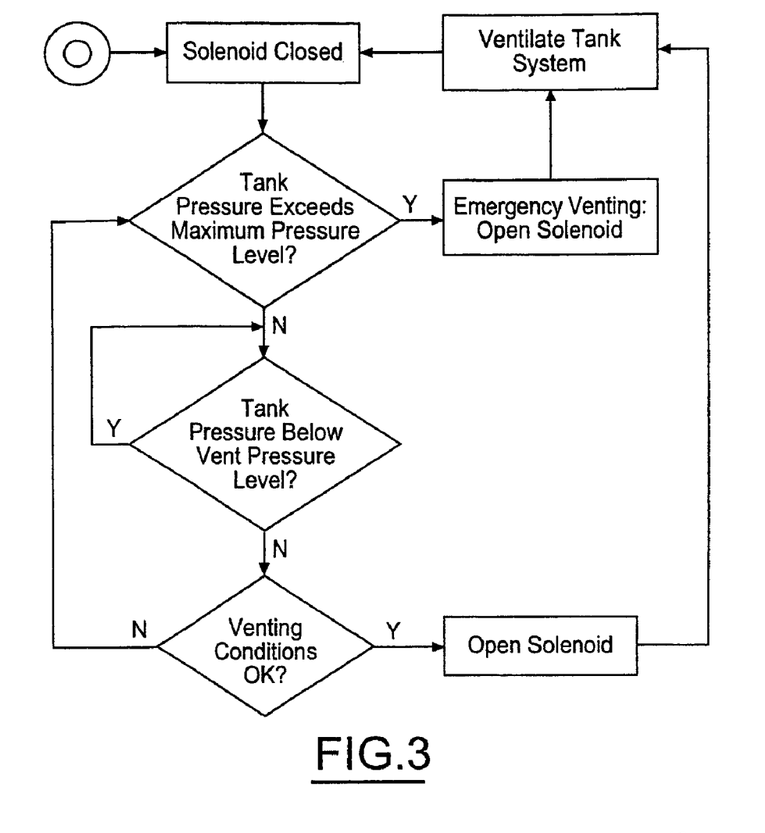
FIG. 3 is a flow diagram of one control scheme for venting a fuel tank with an electrically operated vent valve.

In one implementation, the controller 18 can operate the EOVV 16 according to the general scheme shown in FIG. 3, at least when the vehicle's engine is operating. In this scheme, the EOVV 16 is closed at all times except when certain pressure conditions exist within the vehicle and dynamic vehicle conditions are within certain thresholds such that venting the fuel tank 14 can be safely accomplished and/or accomplished with limited or no liquid fuel escaping through the EOVV 16. The controller 18 is communicated with a pressure sensor 50 and preferably is responsive to an internal fuel tank pressure that is greater than a predetermined maximum pressure to open the EOVV 16 regardless of other vehicle and/or fuel system conditions to reduce the pressure within the fuel tank 14. If the pressure within the fuel tank 14 is below the maximum pressure, the controller 18 determines if the pressure within the fuel tank 14 is below a minimum threshold venting pressure. If the internal tank pressure is below the minimum threshold venting pressure, the controller 18 does not open the EOVV 16. If the internal tank pressure is above minimum threshold venting pressure the controller 18 determines, based on or as a function of other factors and conditions, whether to open the EOVV 16 and permit fuel vapor to vent from the fuel tank 14. After an interval that may be programmed or otherwise determined, or based on a monitored system factor or condition, the EOVV 16 may be closed. For example, when the fuel tank 14 pressure drops below the minimum threshold venting pressure, the EOVV 16 may be closed.

The other factors and conditions that may be monitored to control a venting cycle can include, by way of examples without limitation, inclination, and/or attitude of the vehicle, fuel level within the fuel tank 14, acceleration of the vehicle, internal fuel tank pressure, temperature, and/or some emergency situation of the vehicle (such as a crash that may be indicated by various sensors including those responsive to air bag deployment). Each factor or condition may have a threshold, that when reached or exceeded, will prevent the controller 18 from opening the EOVV 16 (preferably except when the maximum internal tank pressure has been exceeded). The various factors or conditions can also be scaled, graded or otherwise monitored with a combination of two or more factors or conditions preventing the controller 18 from opening the EOVV 16 even if no single factor or condition is at or above its threshold. For example, to limit or prevent liquid fuel flow to the fuel vapor canister 32, the EOVV 16 may be held closed in situations likely to cause liquid fuel to slosh or flow through the EOVV 16. Rapid vehicle acceleration such as by hard braking, cornering and the like, may cause significant fuel sloshing, especially at certain fuel levels, and so when these conditions are sensed the controller 18 may maintain the EOVV 16 closed. If vehicle acceleration factors are not beyond their threshold, but the vehicle is also traversing an incline so that the fuel is displaced from a level attitude within the tank, the combination of these factors may be sufficient to prevent opening the EOVV 16.

Alternatively, a venting scheme can be used wherein the EOVV 16 is normally open and is closed when factors or conditions dictate. Such factors and conditions can be as described above, and generally, may be those indicative of increased potential for liquid fuel to slosh or flow to and through the EOVV 16. In this scheme, it may be less likely that the internal fuel tank pressure will reach the maximum pressure since the EOVV 16 will be normally open.

The rollover valves 28 can be mechanical float driven valves, or they can also be electrically operated valves driven between open and closed positions by a controller 18. If electrically operated, the rollover valves 28 can be operated in the same manner as the EOVV 16, or they may be operated differently. For example, when the beginning of a refueling event is detected, the controller 18 may close the rollover valves 28 and open the EOVV 16 so that all fuel vapor is vented through the EOVV 16, and the EOVV 16 can control refueling shut-off and fill level in the fuel tank 14. Two or more electrically operated valves 16 could be provided with each valve 16 being operated as described with reference to the EOVV 16. The multiple valves can be separated so that even if one is in or adjacent to fuel, one of the other valves 16 may be sufficiently spaced from liquid fuel to permit venting of fuel vapor therethrough. The valves 16 may separately communicate with the vapor canister 32, or their combined output may be communicated with the vapor canister 32. Preferably, the valves 16 close in the event of a vehicle rollover or significant change in attitude to prevent liquid fuel from flowing through the valves. In this manner, the valves 16 may be biased to their closed position, or may include floats or weights that close the valves 16 in such conditions. Such floats or weights may also act as a fail safe to limit the fuel level in the fuel tank 14 should the controller 18 or EOVV 16(s) fail such that the EOVV 16 is not electrically closed.

Accordingly, the fuel system can be responsive to various dynamic and static conditions and factors to efficiently and selectively permit fuel vapor and air to be vented from the fuel tank 14. The sensors, switches and the like can be part of the fuel system 10, or part of the vehicle 12 and can be communicated through an electrical interface with the controller 18 and/or with various other vehicle control units such as a vehicle electronic control unit (ECU).

Figure 5:
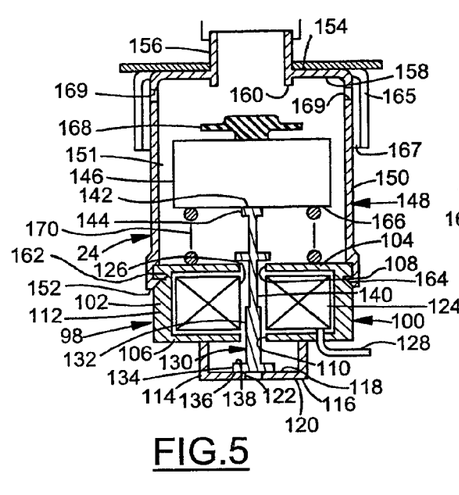
FIG. 5 is a cross-sectional side view of one embodiment of a vent valve from the vehicle fuel system of FIG. 1 shown in an open position.

In FIG. 5, one embodiment of EOVV 16 is shown in an open position with a solenoid 98 of the EOVV 16 in a de-energized state. The solenoid 98 has a frame 100 forming a substantially enclosed coil housing 102 including an upper wall 104, a lower wall 106, axially aligned openings 108, 110 in the upper and lower walls 104, 106 and a generally cylindrical wall 112 extending between the upper and lower walls 104, 106. The frame 100 also has a plunger housing 114 extending generally downwardly from the lower wall 106 of the coil housing 102 (as viewed in FIG. 5). The plunger housing 114 has a bottom wall 116 with an inner surface 118 and an outer surface 120 with an opening 122 extending through the bottom wall 116 to allow for liquid fuel flow through the opening 122.

A generally toroidal shaped wire coil 124 is received in the coil housing 102. The coil 124 has a through passage 126 generally arranged in axial alignment with the openings 108, 110 in the upper and lower walls 104, 106 of the coil housing 102. The coil 124 is desirably attached to a wire 128 through which an electric signal sent from the controller 18 can energize the coil 124, as desired.

The solenoid 98 has a plunger 130 with a shank 132 sized for reciprocating movement within the through passage 126 of the coil 124 and through the opening 110 in the lower wall 106 of the coil housing 102. The plunger 130 also has an enlarged end 134 with a bottom surface 136 that generally abuts the inner surface 118 of the bottom wall 116 of the plunger housing 114 when the coil 124 is in its de-energized state. The enlarged end 134 also has an upper surface 138 that abuts the lower wall 106 of the coil housing 102 when the coil 124 is in the energized state. At its other end, the plunger preferably also has a head 144 with a support surface 142.

The EOVV 16 has a float housing 148, preferably formed separately from the coil housing 102, with a generally cylindrical wall 150 defining a chamber 151 sized to receive a float 146 for reciprocating movement therein. The float housing 148 has one end 152 arranged for attachment to the solenoid frame 100 and another end 154 with an outlet port 156 extending through an end wall 158. Desirably, the outlet port 156 extends at least partially into the chamber 151 to provide a seat 160 that is engaged by the float 146 upon actuation of the solenoid 98 to close the outlet port 156.

To facilitate attaching the float housing 148 to the solenoid frame 100, one or more circumferential tabs 162 extend radially inwardly from the end 152 of the float housing 148. The tabs 162 are configured for receipt in a generally circumferential groove 164 in the wall 112 of the coil housing 102. Desirably, the tabs 162 are received for secure attachment within the groove 162 with a snap fit connection, though it should be recognized that the float housing 148 may be attached to the coil housing 102 in any desired manner.

The float housing 148 has an outer circumferential skirt 165 preferably extending outwardly from the end wall 158 and spaced radially outwardly from the cylindrical wall 150 to define a vapor channel 167 between the skirt 165 and the float housing 148. At least one, and shown here as a pair of openings 169 pass through the cylindrical wall 150 preferably adjacent the end wall 158 to provide fluid communication of the vapor channel 167 with the chamber 151 in the float housing 148. The skirt 165 preferably extends axially below the openings 169 to inhibit liquid fuel from entering the chamber 151 through the vapor channel 167 and openings 169.

The float 146 is received in the float housing 148 for reciprocation therein between a first or open position and a second or closed position when acted on by liquid fuel. The float 146 has a base 166 generally positioned adjacent and in abutting contact with the support surface 142 of the plunger 130, but in one presently preferred embodiment, the float 146 remains separate and unattached from the plunger 130. Desirably, the float 146 carries a seal 168 sized to engage the seat 160 to establish a fluid tight seal when the EOVV 16 is in its closed position. The seal 168 may be attached to or formed as one piece with float 146. The seal 168 is preferably constructed from a flexible and resilient material, for example and without limitation, an elastomeric material suitable for use in liquid fuels with which the fuel tank 14 may be used.

Figure 6:
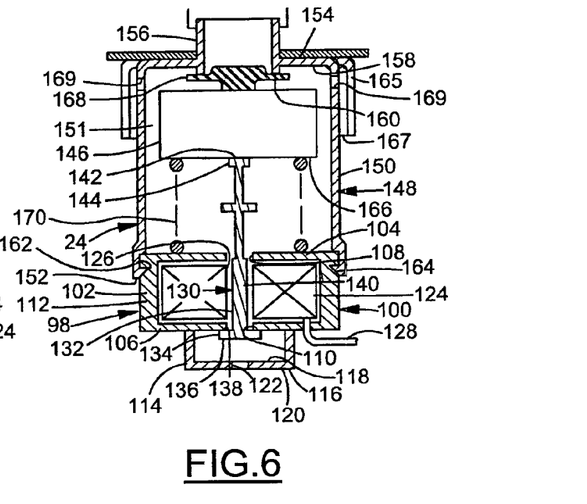
FIG. 6 is a view of the vent valve of FIG. 5 shown in a closed position.

In use and as shown in FIG. 6, when the coil 124 is energized, the plunger 130 is driven generally upwardly (as viewed in FIGS. 5 and 6) into the chamber 151, and moves the float 146 upwardly toward the outlet port 156. At the end of this movement, the seal 168 engages the seat 160 to establish a fluid tight seal, thereby closing off the outlet port 156 to fuel vapor flow. Thereafter, when the coil 124 is de-energized, the plunger 130 moves generally away from the outlet port 156, thereby allowing the float 146, and thus, the seal 168 to disengage and move away from the outlet port 156. Accordingly, with the seal 168 spaced from the seat 160, fuel vapor is generally free to flow through the outlet port 156 and into the fuel vapor canister 32. A spring 170 preferably yieldably biases the float 146 toward the outlet port 156 and provides a force to close the float 146 on the seat 160 in the event of a vehicle roll-over.

In use, as shown in FIG. 5, when the solenoid 98 is de-energized, generally the enlarged end 134 of the plunger 130 abuts the bottom wall 116 of the plunger housing 114, and the float 146 is resting on the spring 170 or the support surface 142 of the plunger 130. Accordingly, the seal 168 is spaced from and disengaged from the seat 160 of the outlet port 156, thereby allowing fuel vapor to flow through the EOVV 16 and into the vapor canister 32.

As previously set forth, the controller 18 can be programmed to limit the fuel level within the fuel tank 14 to a predetermined final fill level before energizing the coil 124 or instructing the coil 124 to be energized. As such, when fuel is added to the fuel tank 14, the coil 124 remains de-energized and fuel vapor is generally free to flow out of the fuel tank 14 through the outlet port 156 until the fuel level approaches a fill level wherein the EOVV 16 should be closed to stop refueling. When the liquid fuel approaches a final or maximum fill level, the controller 18 activates the solenoid 98, thereby closing the valve by engaging the seal 168 with the seat 160 to close off the outlet port 156. Thereafter, the pressure in the fuel tank 14 increases and causes liquid fuel to back-up in the fill pipe 22 and the fuel nozzle 42 to shut off automatically, as discussed above. The sequence may repeat as a result of the EOVV 16 opening upon the liquid fuel settling in the tank 14 or after an interval of time, thereby allowing a trickle fill or rounding up of the fuel level in the fuel tank 14 as desired. Once the liquid fuel in the fuel tank 14 has reached the final fill level, the coil 124 remains energized, causing the seal 168 to remain engaged with the seat 160, thereby preventing more fuel from being added to the fuel tank 14.

Figure 7:
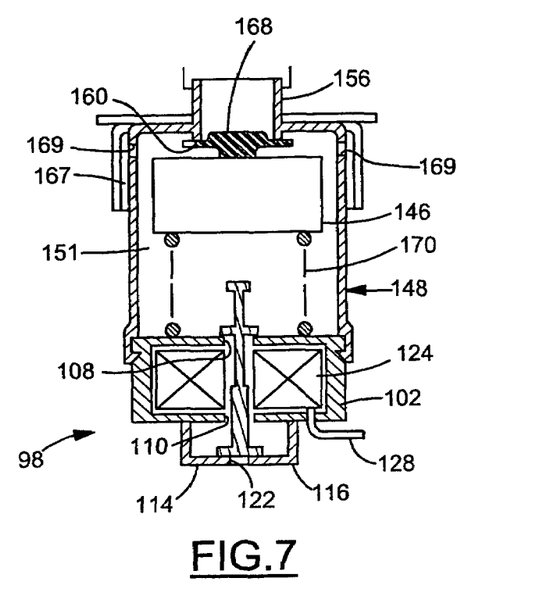
FIG. 7 is a view of the vent valve of FIG. 5 with a float valve shown in a closed position.

As shown in FIG. 7, other than the seal 168 closing off the outlet port 156 in response to the coil 124 being energized, the float 146, and thus the seal 168 close off the outlet port 156 in response to the fuel level reaching a predetermined maximum fill level to prevent, or at least inhibit, liquid fuel from escaping through the outlet port 156. If the coil 124, for what ever reason, does not become energized upon the fuel level reaching or surpassing the final fill level at which it would normally become energized, the liquid fuel begins to enter the chamber 151 of the float housing 148 through the opening 122 in the bottom wall 116 of the plunger housing 114 and flows through the openings 108, 110 in the coil housing 102. As such, liquid fuel enters the chamber 151, and raises the float 146. Accordingly, when the liquid fuel reaches a maximum fill level, the seal 168 sealingly engages the seat 160 of the outlet port 156, thereby closing the EOVV 16 and preventing more liquid fuel from being added to the fuel tank 14 by causing the fuel nozzle 42 to shut off automatically, as discussed above. Liquid fuel can also enter the float housing by sloshing, vehicle inclination or partial inversion, and the like. In these instances, the float can also close off the outlet port 156 and prevent liquid fuel from escaping through the EOVV 16.

In one presently preferred embodiment, the EOVV 16 also functions as a roll-over valve. The roll-over valve function prevents liquid fuel from escaping from the fuel tank 14 through the outlet port 156 if the fuel tank 14 exceeds a predetermined orientation or tilt from horizontal. If the vehicle 12 approaches a predetermined number of degrees inclination relative to horizontal, such as 15 degrees, for example, fuel may flow into the float chamber 151 through the openings 169 in the wall 150 communicating with the vapor channel 167. The liquid fuel entering the chamber 151, in combination with the spring 170, cause the float 146 to move toward the outlet port 156 until the seal 168 engages the seat 160 of the outlet port 156 to prevent liquid fuel and fuel vapor from flowing through the outlet port 156. Preferably, it is not necessary for liquid fuel to fill the chamber 151 for the seal 168 to close off the outlet port 156. Rather, where the vehicle 12 exceeds a predetermined member of degrees tilt from horizontal, such as 45 degrees tilt, for example, gravity and the spring 170 may act together to move the float 146, and thus, the seal 168 toward the outlet port 156 regardless of the level of liquid fuel in the chamber 151. It should be recognized that the float 146 and seal 168 move away from the outlet port 156 if either the liquid fuel level in the fuel tank 14 drops below the maximum fill level, or if the vehicle 12 is returned to an attitude or inclination less than the predetermined angle of tilt from horizontal.

Figure 8:
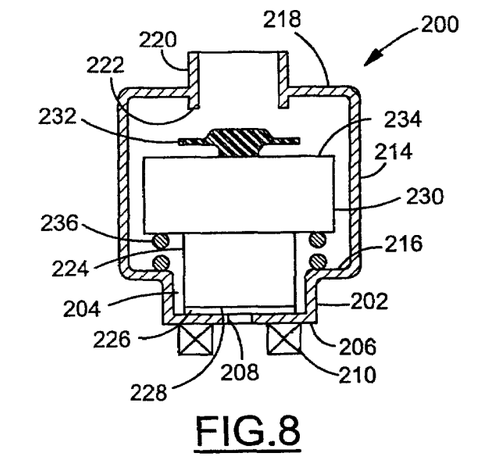
FIG. 8 is a cross-sectional side view of another embodiment of a vent valve from the vehicle fuel system of FIG. 1 shown in an open position.
Figure 9:
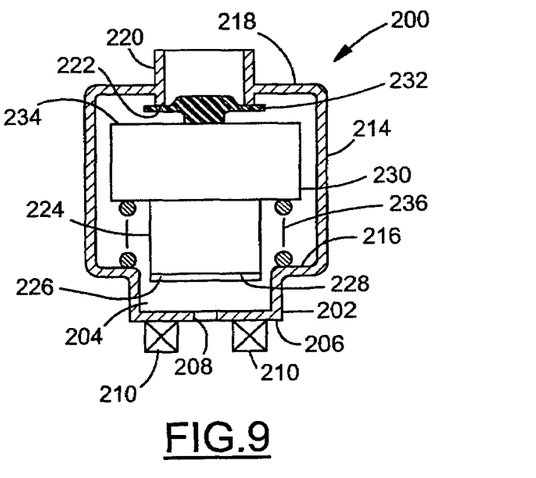
FIG. 9 is a view of the vent valve of FIG. 8 shown in a closed position.

In FIGS. 8 and 9, an alternate embodiment of an EOVV 200 is shown in its open and closed positions, respectively. The EOVV 200 has a generally cylindrical plunger housing 202 defining a cavity 204 with a base 206. Desirably, the base 206 has an opening 208 permitting fluid flow therethrough. An electromagnetic coil 210 is carried by the base, preferably at a bottom surface 212 of the base 206. The coil 210 is operably communicated with the controller 18 that selectively activates the EOVV 200.

The EOVV 200 has a float housing 214 above the plunger housing 202, and preferably integrally formed with the plunger housing. The float housing 214 is preferably cylindrical and has a larger diameter than the plunger housing 202, thereby presenting an annular and radially extending shoulder 216. The float housing 214 has an upper wall 218 with an outlet port 220 extending therethrough. The outlet port 220 preferably extends into the cavity 204 to present a seal lip or seat 222.

The EOVV 200 has a valve member 224, referred to as a plunger hereafter, with a ferromagnetic plate 226 on a bottom surface 228 thereof. The plunger 224 is received for reciprocating movement in the plunger housing 202.

The EOVV 200 has a float 230 with a seal 232 generally attached to or carried adjacent to an upper surface 234 of the float 230. The float 230 is received in the cavity 204 of the float housing 214 generally above the plunger housing 202. Desirably, a spring 236 is received between and abutting the float 230 and the shoulder 216 of the float housing 214. The spring 236 functions generally the same as the spring 170 described above in the previous embodiment, and thus, is not discussed in further detail hereafter.

In use, as shown in FIG. 8, when the coil 210 is de-energized, the plunger 224 engages the base 206 of the plunger housing 202, and the float 230 compresses the spring 236 against the shoulder 216. Accordingly, the seal 232 is spaced from the outlet port 220, thereby allowing fuel vapor to flow through the outlet port 220 and into the vapor canister 32, as discussed in the previous embodiments.

As shown in FIG. 9, when it is desired to close the EOVV 200, the coil 210 is energized generating a magnetic field that repels the ferrous plate 226 on the plunger 224. As a result, the plunger 224 moves away from the coil 210 and causes the float 230 to move with the plunger 224 until the seal 232 engages the seat 222 to close the outlet port 220. Thereafter, the pressure in the fuel tank 14 increases, causing the fuel nozzle 42 to shut off automatically, as discussed in the previous embodiments. The closing and opening of the outlet port 220 may be repeated, thereby allowing a user to top-off the fuel tank 14, depending on the programmed instruction or operation of the controller 18. Once the fuel in the fuel tank 14 has reached the predetermined final fill level, the coil 210 remains energized, thereby causing the seal 232 to remain engaged with the lip 222 to prevent more liquid fuel from being added to the fuel tank 14, as discussed in the previous embodiments.

Figure 10:
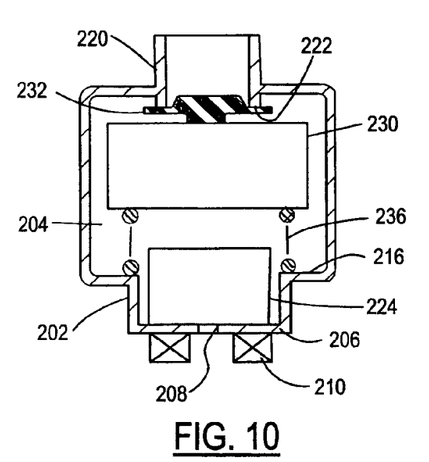
FIG. 10 is a view of the vent valve of FIG. 8 with a float member in a closed position.

As shown in FIG. 10, the float will also raise the seal 232 into engagement with the seat 222 in the presence of liquid fuel. So if the coil 210, for whatever reason, does not become energized upon the fuel level reaching or surpassing the final fill level where it would normally become energized, or if liquid fuel otherwise entered the float housing, the liquid fuel enters the float cavity 204 by flowing through the opening 208 in the base 206 of the plunger housing 202 and flows between the plunger housing 202 and the plunger 224. As such, liquid fuel entering the float cavity 204 raises the float 230, and upon the liquid fuel reaching the maximum fill level, the seal 232 is moved into sealing engagement with the seat 222, thereby preventing fuel vapor from exiting the fuel tank 14, and eventually preventing more liquid fuel from being added to the fuel tank 14, as discussed in the previous embodiments. The EOVV 200 preferably also functions as a roll-over valve as described in the previous embodiment, and thus, is not discussed in further detail hereafter.

Figure 11:
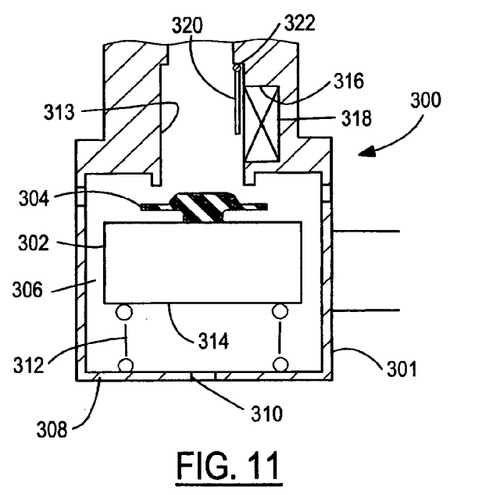
FIG. 11 is a cross-sectional side view of another embodiment of a vent valve from the vehicle fuel system of FIG. 1 shown in an open position.
Figure 12:
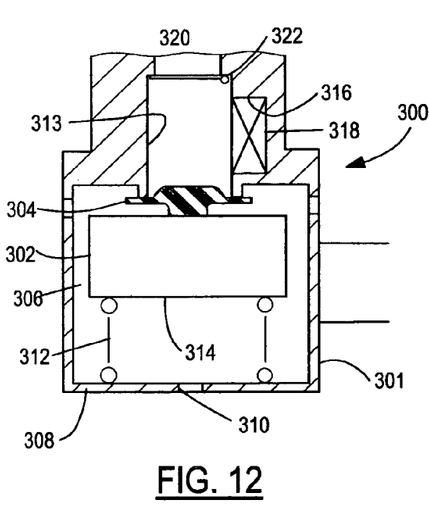
FIG. 12 is a view of the vent valve of FIG. 11 shown in a closed position.

In FIGS. 11 and 12, another embodiment of an EOVV 300 is shown in an open position and a closed position, respectively. The EOVV 300 has a float housing 301 with a float 302 and a seal 304 generally attached thereto for reciprocating movement in a float chamber 306. The float chamber 306 has a base 308 with an opening 310 therein to allow liquid fuel to flow into the float chamber 306. Desirably, a spring 312 is arranged between a base 314 of the float 302 and the base 308 of the housing 301. The spring 312 functions generally the same as described above in the previous embodiment, as thus, is not described in further detail hereafter.

The EOVV 300 has an outlet port 313 extending generally upwardly from the float housing 301 with a coil housing 316 constructed in a wall of the outlet port 313. The coil housing 316 has an electromagnetic coil 318 received therein with the coil 318 being positioned generally adjacent a hinged flap valve 320.

The flap valve 320 is preferably a ferromagnetic plate that pivots about a hinge pin 322 between an open position and a closed position. When in the open position, as shown in FIG. 11, fuel vapor is generally free to flow through the outlet port 313, and when in the closed position, as shown in FIG. 12, fuel vapor preferably is at least substantially prevented from flowing through the outlet port 313, and is maintained in the fuel tank 14.

In use, as shown in FIG. 11, when the coil 318 is not energized, the flap valve 320 is in its open position. The flap valve 320 may be at least partially biased to its open position by gravitational force, or may further be biased by a spring, such as a coil spring (not shown) wrapped about the hinge pin 322, for example. In addition, when the coil is not energized, and when the liquid fuel level within the fuel tank 14 remains below a maximum fill level, the float 302 and the seal 304 remain spaced from the outlet port 313. As such, the outlet port 313 remains open to allow fuel vapor flow therethrough. Accordingly, liquid fuel may be added to the fuel tank 14 until the liquid fuel level in the fuel tank 14 approaches a predetermined final fill level, as discussed in the previous embodiments.

As shown in FIG. 12, when the liquid fuel approaches the final fill level within the fuel tank 14, the coil 318 is energized through an electric signal sent by or via the controller 18, thereby causing the flap valve 320 to move generally away from the coil 318 to its closed position. Thereafter, the pressure in the fuel tank 14 increases and causes the fuel nozzle to shut-off automatically, as discussed in the previous embodiments. The sequence may repeat, thereby allowing a user to top-off the fuel tank, if desired. Once the liquid fuel in the fuel tank 14 has reached a final fill level, the coil 318 remains energized, thereby causing the flap valve 320 to remain in sealing engagement with the outlet port 313 thereby preventing more liquid fuel from being added to the fuel tank 14, as discussed in the previous embodiments.

Figure 13:
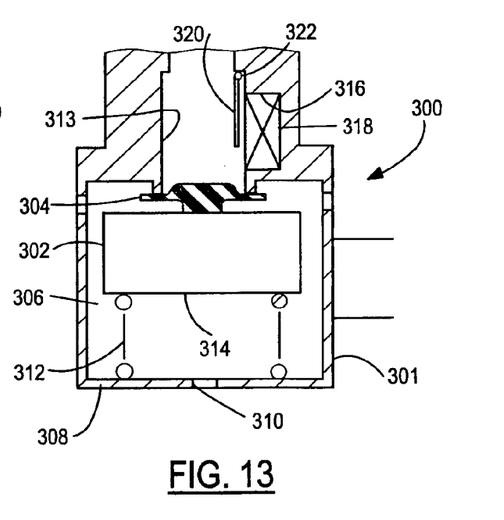
FIG. 13 is a view of the vent valve of FIG. 9 with a float member in a closed position.

As shown in FIG. 13, other than the flap valve 320 closing off the outlet port 313 to the flow of fuel vapor in response to the coil 318 being energized, the float 302, and thus, the seal 304 respond to close off the outlet port 313 to the flow of fuel vapor in response to the presence of liquid fuel in the float housing 301 as set forth in the previously discussed embodiments. If the coil 318, for any reason, does not become energized upon the liquid fuel level surpassing the final fill level at which it would normally become energized, or liquid fuel may otherwise enter the float cavity 306 by flowing through the opening 310. Liquid fuel at a high enough level within the float housing 301 causes the float 302 to rise until the seal 304 closes the outlet port 313, thereby preventing fuel vapor and liquid fuel from exiting the fuel tank 14, and ultimately, preventing additional liquid fuel from being added to the fuel tank 14.

In addition to performing as a shut-off valve to prevent fuel vapor from exiting the fuel tank 14 during normal operation of the vehicle 12, the EOVV 300 can also function as a roll-over valve. The roll-over valve function is achieved in generally the same manner as described in the previous embodiments to prevent liquid fuel from exiting the fuel tank 14 when the fuel tank 14 exceeds a predetermined angle of inclination relative to horizontal, and thus, is not discussed in further detail.

It should be recognized that the embodiments of the fuel arrangement discussed above are intended to be illustrative of some presently preferred embodiments of the invention, and not limiting. Various modifications within the spirit and scope of the invention will be readily apparent to those skilled in the art, such as for example, rearranging the relative position of the a coil to a plunger or other valve mechanism and adding or decreasing the number of openings into a housing of a EOVV 16 to alter the fuel vapor and liquid fuel flow characteristics into and out of the housing, for example. The invention is defined by the claims that follow.

We claim:

1. A fuel system, comprising:
   a fuel tank having at least one opening into an interior of the fuel tank;
   an electrically operated vent valve having an inlet in communication with the interior of the fuel tank and an outlet through which fuel vapor is vented from the fuel tank, the vent valve being movable at least in part in response to an electric signal between an open position to allow fuel vapor to flow from the interior of the fuel tank through the outlet and a closed position to restrict fuel vapor flow through the outlet;
   a float that is movable in response to the movement of the vent valve between a position spaced from the outlet and a position at least substantially restricting fluid flow through the outlet; and
   a controller operably communicated with the vent valve to control application of an electric signal to the vent valve and thereby control at least in part the movement of the vent valve between its open and closed positions.

2. The fuel system of claim 1 which also includes a fill tube having one end in communication with an opening in the fuel tank through which fuel is added to the fuel tank and another end adapted to receive a refueling nozzle, and a refueling sensor associated with the fill tube to determine when fuel is being added to the fuel tank, the refueling sensor being operably communicated with the vent valve so that the vent valve is in its open position during a refueling event to permit fuel vapor to be vented from the fuel tank.

3. The fuel system of claim 1 which also includes a fuel vapor canister having an inlet in communication with the vent valve outlet for receiving fuel vapor from the interior of the fuel tank and an outlet through which fuel may be discharged out of the fuel vapor canister, the vent valve being disposed upstream of the vapor canister.

4. The fuel system of claim 2 wherein the refueling sensor is communicated with the controller which is in turn communicated with the vent valve.

5. The fuel system of claim 1 further comprising a fuel level sensor in electrical communication with the controller, the fuel level sensor being operable to send an electric signal to the controller indicative of the level of fuel within the fuel tank at least when a predetermined level of fuel is reached within the fuel tank and wherein during a refueling event when the predetermined level of fuel is reached within the fuel tank the controller sends a signal to the vent valve to move the vent valve from the open position to the closed position.

6. The fuel system of claim 1 further comprising a pressure sensor communicating with the controller and being operable to send a signal indicative of the pressure within the interior of the fuel tank to the controller.

7. The fuel system of claim 1 wherein the vent valve moves to its closed position in response to inclination of the vent valve beyond a predetermined angle of inclination.

8. The fuel system of claim 5 wherein during a refueling event the fuel level sensor sends signals to the controller at least at intervals so that based on the change in fuel level and the time lapsed between intervals the controller can determine the rate at which fuel is being added to the fuel tank.

9. The fuel system of claim 8 wherein based on the rate at which fuel is being added to the fuel tank the controller sends a signal to close the vent valve a predetermined time before the level of fuel in the fuel tank reaches a predetermined fill level.

10. The fuel system of claim 9 wherein the controller permits the vent valve to move to its open position after an interval of time to permit additional fuel to be added to the fuel tank.

11. The fuel system of claim 10 wherein when a maximum fill level is achieved in the fuel tank, the controller causes the vent valve to remain closed at least until the refueling event has ended.

12. The fuel system of claim 6 wherein in response to an indication from the pressure sensor of a predetermined maximum pressure within the fuel tank, the controller ensures that the vent valve is moved to its open position to reduce the pressure within the fuel tank.

13. The fuel system of claim 1 wherein the vent valve outlet has a flow area that varies between the closed and open positions to enable a variable flow rate for the fuel vapor through the vent valve.

14. The fuel system of claim 3 wherein the fuel vapor canister is maintained within the fuel tank.

15. The fuel system of claim 1 wherein the vent valve includes a solenoid that is driven by an electric signal to move the vent valve between its open position and its closed position.

16. The fuel system of claim 15 wherein the float is movable in response to the actuation of the solenoid between a position spaced from the outlet and a position at least substantially restricting fluid flow through the outlet.

17. The fuel system of claim 16 wherein the vent valve includes a seat adjacent to the outlet and the float includes a seal carried by the float and engageable with the seat to define the closed position of the vent valve and at least substantially restrict fluid flow through the outlet.

18. The fuel system of claim 1 which also includes at least one sensor responsive to a vehicle operational condition and in communication with the controller so that when said vehicle operational condition exceeds a predetermined threshold the controller ensures the vent valve is closed to prevent fluid flow therethrough.

19. The fuel system of claim 18 wherein said sensor is responsive to acceleration of the vehicle.

20. The fuel system of claim 2 wherein said refueling sensor is responsive to insertion of a refueling nozzle into the fill tube.

21. The fuel system of claim 20 wherein the fill tube includes a fill door that is moved by a refueling nozzle when said nozzle is inserted into the fill tube and said sensor is responsive to movement of the fill door.

22. The fuel system of claim 5 wherein said controller is programmed to be responsive during a refueling event to close the vent valve at more than one fill level with the vent valve being opened between said closures until a predetermined maximum fill level is attained in the fuel tank.

23. A vent valve for controlling the fuel level and venting of a fuel tank, comprising:
a housing having an outlet operably communicated with fluid within a fuel tank;
an electrically operated valve element carried by the housing, and movable in response to application of an electric signal to the valve for movement between a first position and a second position; and
a float received in the housing for movement relative to the outlet in response to movement of the valve element, the float being movable between an open position permitting fluid flow through the outlet and a closed position at least substantially restricting fluid flow through the outlet.

24. The vent valve of claim 23 which also comprises a wire coil carried by the housing and wherein the valve element includes a plunger movable in response to application of an electric signal to the coil, the plunger being arranged to engage the float when the coil is energized to facilitate movement of the float to its second position.

25. The vent valve of claim 24 wherein the coil has a through passage sized for reciprocating movement of at least a portion of the plunger therethrough.

26. The vent valve of claim 23 further comprising a spring yieldably biasing the float toward its second position.

27. The vent valve of claim 23 wherein the outlet is defined by a port that extends at least partially into the housing to provide a seat engageable by a valve member moved by the float onto the seat when the float is in its second position.

28. The vent valve of claim 24 wherein the housing includes a coil housing in which the coil is received and having an opening allowing liquid fuel to flow into the housing.

29. The vent valve of claim 25 wherein the housing has an opening allowing liquid fuel in the fuel tank to enter the housing to cause the float to move to its second position.

30. The vent valve of claim 29 wherein the housing has a wall surrounding the outlet and further comprising a circumferential skirt spaced radially outwardly from the wall to define a vapor channel between the skirt and the wall of the housing.

31. The vent valve of claim 30 wherein the skirt extends below the opening in the housing to inhibit liquid fuel from entering the cavity through the vapor channel.

32. The vent valve of claim 24 wherein the valve element includes a ferromagnetic portion that is moved relative to the coil upon energizing the coil.

33. The vent valve of claim 23 wherein the vent valve includes a valve seat adjacent to the outlet and the valve element is movable between an open position permitting fluid flow through the outlet and a closed position engaged with the valve seat to at least substantially restrict fluid flow through the outlet.

34. The vent valve of claim 33 wherein the valve element is pivotally carried by the housing and is movable to its closed position in response to the coil being energized and to its open position when the coil is not energized.

35. The vent valve of claim 34 further comprising a spring biasing the valve element to its open position.

* * * * *